(12) United States Patent
Wang et al.

(10) Patent No.: US 10,160,332 B2
(45) Date of Patent: Dec. 25, 2018

(54) ELECTRIC POWER DISTRIBUTION SYSTEM AND TOPOLOGY

(71) Applicant: GM GLOBAL TECHNOLOGY OPERATIONS LLC, Detroit, MI (US)

(72) Inventors: Konking Wang, Canton, MI (US); Steven V. Wybo, Grosse Pointe Park, MI (US); Kris S. Sevel, Rochester Hills, MI (US); Charles J. Swan, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 230 days.

(21) Appl. No.: 15/220,721

(22) Filed: Jul. 27, 2016

(65) Prior Publication Data

US 2018/0029479 A1 Feb. 1, 2018

(51) Int. Cl.
*B60L 11/18* (2006.01)
*H02M 1/32* (2007.01)
*B60L 11/02* (2006.01)
*H02M 3/335* (2006.01)

(52) U.S. Cl.
CPC ........... *B60L 11/02* (2013.01); *B60L 11/1809* (2013.01); *H02M 1/32* (2013.01); *H02M 3/33507* (2013.01); *H02M 3/33584* (2013.01); *H02M 2001/322* (2013.01)

(58) Field of Classification Search
CPC .. B60L 11/02; B60L 11/1861; B60L 11/1816; B60L 11/185; B60L 11/16; B60L 11/182
USPC .................................................. 307/9.1, 10.1
See application file for complete search history.

(56) References Cited

U.S. PATENT DOCUMENTS

2015/0306960 A1* 10/2015 Sobu ....................... H02M 1/44
307/10.1

* cited by examiner

*Primary Examiner* — John W Poos
(74) *Attorney, Agent, or Firm* — Quinn IP Law

(57) ABSTRACT

A topology for electric power distribution in a vehicle includes a high-voltage bus connected to a DC-DC electric power converter that is connected to a low-voltage DC load. The DC-DC electric power converter includes a high-voltage switching circuit, a transformer, and a low-voltage rectifier. The high-voltage switching circuit includes first and second switches arranged in series between positive and negative legs of the high-voltage electric power bus at a first node that connects to a leg of an inductor of the transformer. A controller receives a command to discharge the high-voltage electric power bus, and in response, controls a first gate circuit to operate a first switch in a linear mode, and controls a second gate circuit to operate a second switch in a pulsewidth-modulated mode. A duty cycle for the pulsewidth-modulated operation of the second switch is determined based upon the magnitude of electric current.

19 Claims, 2 Drawing Sheets

ELECTRIC POWER DISTRIBUTION SYSTEM AND TOPOLOGY

TECHNICAL FIELD

The disclosure relates to high-voltage electric power distribution systems and topologies for vehicles.

BACKGROUND

Electrified vehicles include electric power distribution systems to supply high-voltage and low-voltage electric power to various devices for propulsion and other on-vehicle electric power needs. There are requirements for systems to have a discharge path to discharge high-voltage electric power under certain circumstances.

SUMMARY

A topology for electric power distribution in a vehicle is described, and includes a high-voltage bus electrically connected to a DC-DC electric power converter that is electrically connected to a low-voltage DC load. The DC-DC electric power converter includes a high-voltage switching circuit, a transformer, and a low-voltage rectifier. The high-voltage switching circuit includes first and second switches arranged in series between positive and negative legs of the high-voltage electric power bus and electrically connected at a first node, and the first node electrically connects to a first leg of a first inductor of the transformer. A current sensor is disposed to monitor a magnitude of electric current in the high-voltage power bus. A first gate circuit including a first gate bias voltage source is electrically connected to a gate of the first switch, and a second gate circuit including a second gate bias voltage source electrically connected to a gate of the second switch. A controller is operatively connected to the first gate circuit and the second gate circuit and is in communication with the current sensor. The controller includes an instruction set that is executable to receive a command to discharge the high-voltage electric power bus, and in response, control the first gate circuit to operate the first switch in a linear mode, and control the second gate circuit to operate the second switch in a pulsewidth-modulated mode. A duty cycle for the pulsewidth-modulated operation of the second switch is determined based upon the magnitude of electric current.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 1:
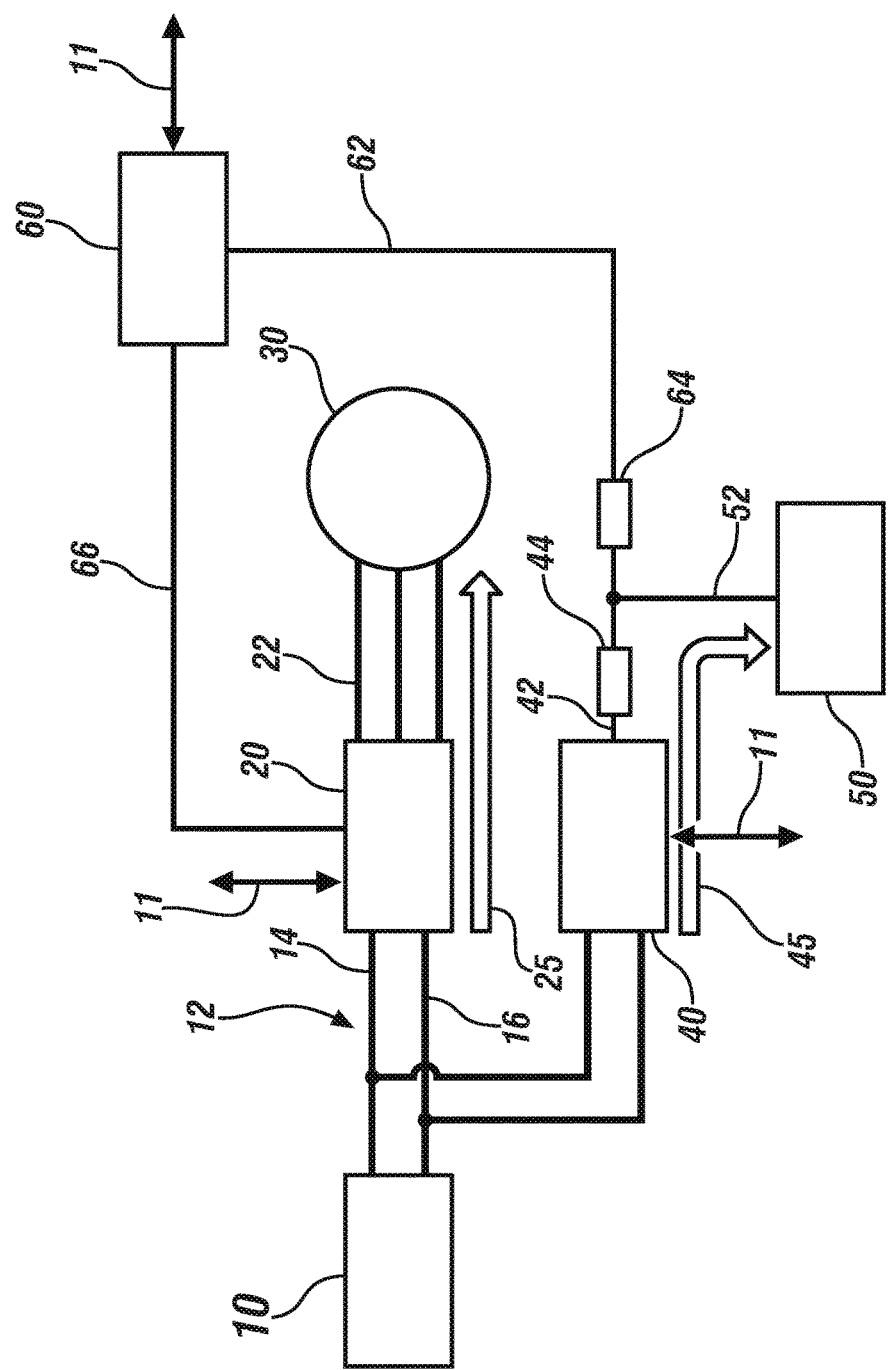
FIG. 1 schematically shows an electric power distribution topology that may be employed on a vehicle, including a high-voltage DC power source, a DC-AC inverter module, an electric motor/generator, a DC-DC electric power converter, a low-voltage DC power source and a low-voltage electric power distribution center, in accordance with the disclosure.

Referring to the drawings, wherein like reference numerals correspond to like or similar components throughout the several Figures, FIG. 1 schematically shows an electric power distribution topology 100 that may be employed on a vehicle (not shown). The vehicle may include, but not be limited to, a passenger vehicle, a light-duty or heavy-duty truck, a utility vehicle, an agricultural vehicle, an industrial/warehouse vehicle, or a recreational off-road vehicle. It is also contemplated that the vehicle may be any mobile platform, such as an airplane, all-terrain vehicle (ATV), boat, personal movement apparatus, robot and the like to accomplish the purposes of this disclosure.

The electric power distribution topology 100 includes a high-voltage DC power source 10, a DC-AC inverter module 20, an electric motor/generator (electric machine) 30, a DC-DC electric power converter 40, a low-voltage DC power source 50 and a low-voltage electric power distribution center 60. A high-voltage electric power bus 12 including positive and negative legs 14, 16, respectively is arranged to electrically connect the high-voltage DC power source 10, the DC-AC inverter module 20 and the DC-DC electric power converter 40. The low-voltage electric power distribution center 60 is disposed to supply low-voltage electric power to the DC-AC inverter module 20 via electric line 66.

The high-voltage DC power source 10 may be any high-voltage energy storage device, e.g., a multi-cell lithium ion device, an ultracapacitor, or another suitable device without limitation. The DC-AC inverter module 20 is configured to transform high-voltage DC electric power originating from the high-voltage DC power source 10 to AC power, and the AC power is supplied via electric lines 22 to the electric machine 30 to generate torque. The DC-AC inverter module 20 is configured with suitable control circuits including power transistors, e.g., IGBTs for transforming high-voltage DC electric power to high-voltage AC electric power and transforming high-voltage AC electric power to high-voltage DC electric power. The DC-AC inverter module 20 preferably employs pulsewidth-modulating (PWM) control to convert stored DC electric power originating in the high-voltage DC power source 10 to AC electric power to drive the electric machine 30 to generate torque. Similarly, the DC-AC inverter module 20 converts mechanical power transferred to the electric machine 30 to DC electric power to generate electric energy that is storable in the high-voltage DC power source 10, including as part of a regenerative power control strategy.

The electric machine 30 is preferably a high-voltage multi-phase electric motor/generator that electrically connects to the high-voltage DC power source 10 via the DC-AC inverter module 20. The electric machine 30 is configured to convert stored electric energy to mechanical power and convert mechanical power to electric energy that may be stored in the high-voltage DC power source 10. The mechanical power associated with the electric machine 30 supplies propulsion power for the vehicle in one embodiment. In one embodiment, the high-voltage DC power source 10 may electrically connect via an on-vehicle battery charger (not shown) to a remote, off-vehicle electric power source for charging while the vehicle is stationary. The DC-DC electric power converter 40 is configured to transform high-voltage DC electric power to low-voltage DC electric power, and the low-voltage DC electric power can be transferred to charge the low-voltage DC power source 50 and to supply electric power to the low-voltage electric power distribution center 60 via electric lines 42, 52 and 62. The low-voltage DC power source 50 electrically connects to the low-voltage electric power distribution center 60 to provide low-voltage electric power to low-voltage systems on the vehicle, including, by way of non-limiting examples, electric windows, HVAC fans, seats, a low-voltage electrical starter, etc.

A first high-voltage electric power discharge path 25 is indicated, and passes through the DC-AC inverter module 20 to the electric machine 30. A second high-voltage electric power discharge path 45 is indicated, and passes through the DC-DC electric power converter 40 to the low-voltage DC power source 50. First and second in-line fuses 44, 64, respectively, are disposed to protect the integrity of the electric lines and related devices. The first in-line fuse 44 is preferably located at a low voltage outlet side of the DC-DC electric power converter 40 to protect against reverse polarity in one embodiment. The second in-line fuse 64 is preferably located to protect the second high-voltage electric power discharge path 45 in the event of occurrence of a short circuit in the low-voltage electric power distribution center 60.

Figure 2:
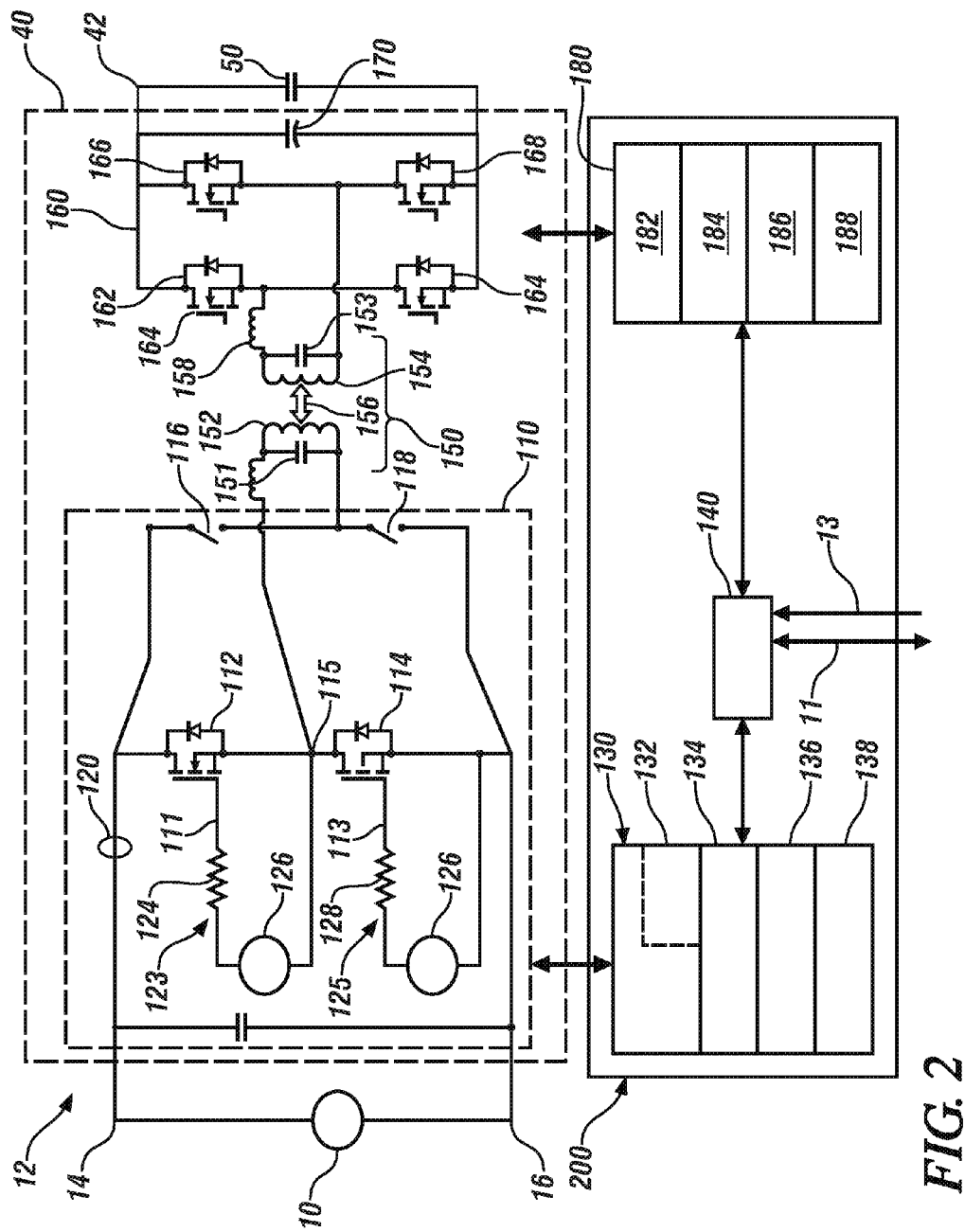
FIG. 2 schematically shows the DC-DC electric power converter including a high-voltage switching circuit, a transformer, a low-voltage rectifier and an associated controller, in accordance with the disclosure.

FIG. 2 schematically shows pertinent details related to the DC-DC electric power converter 40 that is described with reference to FIG. 1. The DC-DC electric power converter 40 is configured to transform high-voltage DC electric power originating from the high-voltage DC power source 10 via the high-voltage bus 12 to low-voltage DC electric power, and the low-voltage DC electric power can be transferred to a low-voltage power source, e.g., the low-voltage DC power source 50. Alternatively, the low-voltage DC electric power can be transferred to any low-voltage power load that is electrically connected to electric line 42, including, e.g., an electric power steering system.

The DC-DC electric power converter 40 preferably includes a high-voltage switching circuit 110, a transformer 150, and a low-voltage rectifier 160. A controller 200 is in communication with the DC-DC electric power converter 40, and preferably includes a power converter controller 140, a high-voltage switching circuit controller 130 and a low-voltage switch circuit controller 180. The illustration of the controller 200 is provided for ease of description. The elements of the controller 200 may be implemented in any suitable configuration.

The high-voltage switching circuit 110 includes first, second, third and fourth transistor switches 112, 114, 116 and 118, respectively, that are arranged between the positive and negative legs 14, 16 of the high-voltage electric power bus 12. This includes the first and second transistor switches 112, 114 arranged in series between the positive and negative legs 14, 16 of the high-voltage electric power bus 12 and electrically connected at a first node 115. This also includes the third and fourth transistor switches 116, 118 arranged in series between the positive and negative legs 14, 16 of the high-voltage electric power bus 12 and electrically connected at a second node 117. The first node 115 electrically connects to a first leg of the primary inductive coil 152 of the transformer 150. The second node 117 electrically connects to a second leg of the primary inductive coil 152 of the transformer 150. A current sensor 120 is disposed to monitor a magnitude of electric current in the positive leg 14 of the high-voltage power bus 12.

A first gate circuit 123 is disposed to provide a control signal to a gate 111 of the first transistor switch 112, and preferably includes the first gate bias voltage source 122 that is electrically connected via a first gate resistor 124 to the gate 111 of the first transistor switch 112. A second gate circuit 125 is disposed to provide a control signal to a gate 113 of the second transistor switch 114, and preferably includes the second gate bias voltage source 126 that is electrically connected via a second gate resistor 128 to the gate 113 of the second transistor switch 114. The first and second transistor switches 112, 114 are preferably power MOSFETs (metal-oxide-silicon field-effect transistors) or another suitable switching device that is capable of handling high levels of electric power, including sustained operation in a linear range.

The high-voltage switching circuit controller 130 preferably includes a switching element driving circuit 132, a current sensing circuit 134, a voltage sensing circuit 136 and a temperature sensing circuit 138. In one embodiment, a first gate bias voltage source 122 and a second gate bias voltage source 126 are incorporated into the switching element driving circuit 132 of the high-voltage switching circuit controller 130. The high-voltage switching circuit controller 130 is in communication with the first gate bias voltage source 122 and the second gate bias voltage source 126.

The transformer 150 preferably includes a primary inductive coil 152 and a secondary inductive coil 154 that are electrically coupled via an electro-magnetic core 156. The transformer 150 may also include a primary capacitor 151, a secondary capacitor 153 and a choke coil 158 for smoothing or otherwise filtering electrical voltages. The sizes and relative coil counts of the primary inductive coil 152 and the secondary inductive coil 154 are selected to reduce the high-voltage DC electric power to low-voltage DC electric power. In one non-limiting embodiment, this may include a reduction from a high-voltage DC electric power having a nominal magnitude of 300 V DC to a low-voltage DC electric power having a nominal magnitude of 12 V DC. Other magnitudes of high-voltage and low-voltage DC electric power may be employed.

The low-voltage rectifier 160 preferably includes a plurality of transistors 162, 164, 166, and 168 that are arranged in a bridge configuration and electrically connected to the legs of the secondary inductive coil 154, with an output that electrically connects to the low-voltage DC power source 50 across a low-voltage output capacitor 170. In one embodiment, the transistors 162, 164, 166, and 168 may be replaced with diodes.

The low-voltage switch circuit controller 180 preferably includes a switching element driving circuit 182, and may also include a current sensing circuit 184, a voltage sensing circuit 186 and a temperature sensing circuit 188. The low-voltage switch circuit controller 180 communicates with the gates of each of the plurality of transistors 162, 164, 166, and 168 of the low-voltage rectifier 160 via the switching element driving circuit 182 to control a rectification process. The rectification process includes controlling the transistors 162, 164, 166, and 168 of the low-voltage rectifier 160 to achieve a stable DC voltage at the electric line 42 that electrically connects to the low-voltage battery 50.

The controller 200 includes the power converter controller 140 in communication with the high-voltage switching circuit controller 130 and the low-voltage switch circuit controller 180. The power converter controller 140 preferably includes an executable instruction set that is disposed to control operations of the high-voltage switching circuit controller 130 and the low-voltage switch circuit controller 180 to transform the high-voltage electric power to provide a stable low-voltage electric power that is output to the electric line 42. The controller 200 communicates with other on-vehicle controllers via a communication link 11, e.g., a communication bus. The controller 200 may also communicate directly with an on-vehicle controller or device, e.g., a sensor, via a direct communication link 13.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link 11. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium.

Referring again to FIG. 1, with continued reference to FIG. 2, the electric power distribution topology 100 is configured to provide redundant high-voltage discharge paths. The first high-voltage electric power discharge path 25 through the DC-AC inverter module 20 to windings of the electric machine 30 may be employed in response to a command to execute a high-voltage discharge event when the low-voltage electric power distribution center 60 is able to supply low-voltage electric power to the DC-AC inverter module 20 via electric line 66.

The second high-voltage electric power discharge path 45 through the DC-DC electric power converter 40 to the low-voltage DC power source 50 may be employed in response to the command to execute a high-voltage discharge event when the low-voltage electric power distribution center 60 is unable to supply low-voltage electric power to the DC-AC inverter module 20 via electric line 66.

During operation, the controller 200 may receive a command to discharge the high-voltage electric power bus 12 through the second high-voltage electric power discharge path 45, wherein the command to discharge is communicated via either the communication link 11 or the direct communication link 13. In response to the command to discharge the high-voltage electric power bus 12 through the second high-voltage electric power discharge path 45, the controller 200 commands the high-voltage switching circuit controller 130 to control the first gate circuit 123 of the high-voltage switching circuit 110 to operate the first transistor switch 112 in a linear mode, and coincidently control the second gate circuit 125 to operate the second transistor switch 114 in a pulsewidth modulation mode, wherein a duty cycle for the pulsewidth modulation control is determined based upon the magnitude of electric current that is measured with the current sensor 120. The relation between the duty cycle for the pulsewidth modulation control and the magnitude of electric current preferably includes increasing the duty cycle for the pulsewidth-modulated control of the second gate circuit 125 in response to an increase in the magnitude of the electric current, and decreasing the duty cycle for the pulsewidth-modulated control of the second gate circuit 125 in response to a decrease in the magnitude of the electric current.

The command to discharge the high-voltage electric power bus 12 through the second high-voltage electric power discharge path 45 may be implemented when the low-voltage electric power distribution center 60 experiences a fault or a short circuit. The command to discharge the high-voltage electric power bus 12 through the second high-voltage electric power discharge path 45 may be implemented when the low-voltage electric power distribution center 60 is unable to supply low-voltage power to the DC-AC inverter module 20, or the DC-AC inverter module 20 experiences a reset. The command to discharge the high-voltage electric power bus 12 through the second high-voltage electric power discharge path 45 may be implemented when the first high-voltage electric power discharge path 25 through the DC-AC inverter module 20 to the electric machine 30 is interrupted. The command to discharge the high-voltage electric power bus 12 through the second high-voltage electric power discharge path 45 may be implemented when the second in-line fuse 64 that is located to protect the second high-voltage electric power discharge path 45 is opened. The command to discharge the high-voltage electric power bus 12 through the second high-voltage electric power discharge path 45 continues to be in effect so long as the voltage level on the high-voltage bus 12 is greater than a threshold voltage, e.g., 60 V DC. When the voltage of the high-voltage bus 12 is within a normal operation voltage range of the DC-DC electric power converter 40, the DC-DC electric power converter 40 discharges the energy on the high-voltage bus 12 to the low-voltage DC power source 50, i.e., the energy is saved. As such, the second high-voltage electric power discharge path 45 provides a redundant mechanism to discharge the electric power on the high-voltage bus 12 in the event of occurrence of a fault associated with the first high-voltage electric power discharge path 25.

Those having ordinary skill in the art will recognize that the teachings may be described herein in terms of functional and/or logical block components and/or various processing steps. It should be realized that such block components may be composed of any number of hardware, software, and/or firmware components configured to perform the specified functions.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A topology for electric power distribution in a vehicle, comprising:
   a high-voltage bus electrically connected to a DC-DC electric power converter that is electrically connected to a low-voltage DC load;
   the DC-DC electric power converter including a high-voltage switching circuit, a transformer, and a low-voltage rectifier, wherein the high-voltage switching circuit includes first and second switches arranged in series between positive and negative legs of the high-voltage electric power bus and electrically connected at a first node, and wherein the first node electrically connects to a first leg of a first inductor of the transformer;
   a current sensor disposed to monitor a magnitude of electric current in the high-voltage power bus;
   a first gate circuit including a first gate bias voltage source electrically connected to a gate of the first switch;
   a second gate circuit including a second gate bias voltage source electrically connected to a gate of the second switch;
   a first fuse disposed between the DC-DC electric power converter and the low-voltage DC load; and
   a controller, operatively connected to the first gate circuit and the second gate circuit and in communication with the current sensor, the controller including an instruction set, the instruction set executable to:
      receive a command to discharge the high-voltage electric power bus,
      control the first gate circuit to control the first switch in a linear mode, and
      control the second gate circuit to pulsewidth-modulate control the second switch, wherein a duty cycle for the pulsewidth-modulated control of the second gate circuit is determined based upon the magnitude of electric current.

2. The topology of claim 1, further comprising the high-voltage switching circuit including third and fourth switches arranged in series between the positive and negative legs of the high-voltage electric power bus and electrically connected at a second node, wherein the second node electrically connects to a second leg of the first inductor of the transformer.

3. The topology of claim 1, further comprising a low-voltage electric power distribution center electrically connected to a DC-AC inverter module that is electrically connected to the high-voltage bus.

4. The topology of claim 3, further comprising the low-voltage electric power distribution center electrically connected to the low-voltage DC load via a second fuse.

5. The topology of claim 4, wherein the low-voltage DC load comprises a low-voltage DC power source disposed to supply low-voltage electric power to the low-voltage electric power distribution center.

6. The topology of claim 3, further comprising the DC-AC inverter module electrically connected to an electric machine disposed to supply propulsion power to the vehicle.

7. The topology of claim 1, wherein each of the first and second switches comprises a MOSFET transistor.

8. The topology of claim 1, wherein the transformer includes a second inductor, wherein the second inductor is electrically connected to a low-voltage rectifier that is electrically connected to the low-voltage DC load.

9. The topology of claim 1, comprising the instruction set executable to control the second gate circuit to pulsewidth-modulate the second switch at a duty cycle that is determined based upon the magnitude of electric current.

10. The topology of claim 9, comprising the instruction set executable to increase the duty cycle for the pulsewidth-modulated control of the second gate circuit in response to an increase in the magnitude of the electric current, and decrease the duty cycle for the pulsewidth-modulated control of the second gate circuit in response to a decrease in the magnitude of the electric current.

11. An electric power distribution system, comprising:
    a high-voltage bus electrically connected to a DC-DC electric power converter that is electrically connected to a low-voltage DC power supply;
    the DC-DC electric power converter including a high-voltage switching circuit, a transformer, and a low-voltage rectifier, wherein the high-voltage switching circuit includes first and second switches arranged in series between positive and negative legs of the high-voltage electric power bus and electrically connected at a first node, and wherein the first node electrically connects to a first leg of a first inductor of the transformer;
    the high-voltage bus electrically connected to a DC-AC inverter module;
    a current sensor disposed to monitor a magnitude of electric current in the high-voltage power bus;
    a first gate circuit including a first gate bias voltage source electrically connected to a gate of the first switch;
    a second gate circuit including a second gate bias voltage source electrically connected to a gate of the second switch; and
    a controller, operatively connected to the first gate circuit and the second gate circuit and in communication with the current sensor, the controller including an instruction set, the instruction set executable to:
       receive a command to discharge the high-voltage electric power bus,
       control the first gate circuit to operate the first switch in a linear mode, and
       control the second gate circuit to pulsewidth-modulate the second switch, wherein a duty cycle for the pulsewidth-modulated control of the second gate circuit is determined based upon the magnitude of electric current.

12. The electric power distribution system of claim 11, further comprising the low-voltage DC power supply electrically connected to a low-voltage electric power distribution center, and the low-voltage electric power distribution center electrically connected to the DC-AC inverter module.

13. The electric power distribution system of claim 12, further comprising the low-voltage electric power distribution center electrically connected to the low-voltage DC load via a second fuse.

14. The electric power distribution system of claim 11, further comprising the DC-AC inverter module electrically connected to an electric machine.

15. The electric power distribution system of claim 11, wherein each of the first and second switches comprises a MOSFET transistor.

16. The electric power distribution system of claim 11, further comprising the high-voltage switching circuit including third and fourth switches arranged in series between the positive and negative legs of the high-voltage electric power bus and electrically connected at a second node, wherein the second node electrically connects to a second leg of the first inductor of the transformer.

17. The electric power distribution system of claim 11, further comprising a first fuse disposed between the DC-DC electric power converter and the low-voltage DC load.

18. The electric power distribution system of claim 11, comprising the instruction set executable to control the second gate circuit to pulsewidth-modulate the second switch at a duty cycle that is determined based upon the magnitude of electric current.

19. The electric power distribution system of claim 18, comprising the instruction set executable to increase the duty cycle for the pulsewidth-modulated control of the second gate circuit in response to an increase in the magnitude of the electric current, and decrease the duty cycle for the pulsewidth-modulated control of the second gate circuit in response to a decrease in the magnitude of the electric current.

* * * * *